United States Patent
Manu et al.

(10) Patent No.: US 7,110,914 B2
(45) Date of Patent: Sep. 19, 2006

(54) FLEXIBLE VARIABLE AND EXECUTION MATRIX

(75) Inventors: Cristina Manu, Sammamish, WA (US); Mitica Manu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 43 days.

(21) Appl. No.: 10/700,178

(22) Filed: Nov. 3, 2003

(65) Prior Publication Data

US 2005/0096867 A1     May 5, 2005

(51) Int. Cl.
    *G06F 1/00*     (2006.01)
(52) U.S. Cl. .................................... 702/181
(58) Field of Classification Search ............ None
    See application file for complete search history.

(56) References Cited

U.S. PATENT DOCUMENTS

| | | | |
|---|---|---|---|
| 6,512,982 B1 * | 1/2003 | Yang et al. ............... 702/34 |
| 6,802,057 B1 * | 10/2004 | Hinker et al. ............ 717/137 |
| 6,829,731 B1 * | 12/2004 | LaFauci et al. ........... 714/33 |
| 2004/0153830 A1 * | 8/2004 | Cebula et al. ............ 714/38 |
| 2004/0199444 A1 * | 10/2004 | Woodcock et al. ........ 705/35 |
| 2004/0221238 A1 * | 11/2004 | Cifra et al. .............. 715/762 |
| 2005/0076002 A1 * | 4/2005 | Williams et al. .......... 707/1 |
| 2005/0210085 A1 * | 9/2005 | Bessiere .................. 708/100 |
| 2006/0009993 A1 * | 1/2006 | Guo et al. ................ 705/1 |

* cited by examiner

*Primary Examiner*—Carol S. W. Tsai
(74) *Attorney, Agent, or Firm*—Banner & Witcoff, Ltd.

(57) ABSTRACT

Systems and methods are provided for selecting parameter values and combinations of parameter values to use in connection with testing. A graphical user interface allows a user to graphically illustrate the importance of parameter values by drawing a probability curve for each parameter. The resulting curves are then converted to mathematical functions that are then combined into a combination function. The combination function is then evaluated for different parameter value combinations. The parameter value combinations that cause the combination function to exceed a predetermined probability value are selected for testing.

17 Claims, 5 Drawing Sheets

FLEXIBLE VARIABLE AND EXECUTION MATRIX

FIELD OF THE INVENTION

Aspects of the present invention relate to the testing of hardware and software. More specifically, aspects of the present invention provide a graphical user interface and methods that assist users in selecting parameter values to test.

BACKGROUND

Software modules, such as application programming interfaces, continue to become increasingly complex. Such modules may include a larger number of input parameters and parameter combinations. The testing of software modules typically includes selecting parameter values and parameter value combinations. The combinations of parameter values are then applied to the software module and the resulting output is analyzed.

The selection of parameter values and combinations of parameter values is critical to ensure that a software module is operating properly. It is generally desirable to test the values and combinations of values that are mostly likely to occur during the operation of the software module. Existing systems and methods for selecting parameter values and combinations of parameter values can be time consuming and error prone. For example, manually selecting parameter values and combinations of parameter values can take a long time. And, for complex software modules that have a large number of parameters, the manual selection of parameter values and combinations of parameter values can result in a testing procedure that does not include testing critical inputs.

Therefore, there is a need in the art for efficient and accurate systems and methods for selecting input parameters and combinations of parameter values to use when testing software modules.

BRIEF SUMMARY

Aspects of the present invention address one or more of the issues mentioned above, thereby providing improved systems and methods for selecting parameter values and combinations of parameter values to use when testing software modules. A graphical user interface allows a user to graphically illustrate the importance of parameter values by drawing a probability curve for each parameter. The resulting curves are then converted to mathematical functions that are then combined into a combination function. The combination function is then evaluated for different parameter value combinations. The parameter value combinations that cause the combination function to exceed a predetermined probability value are selected for testing.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Figure 1:
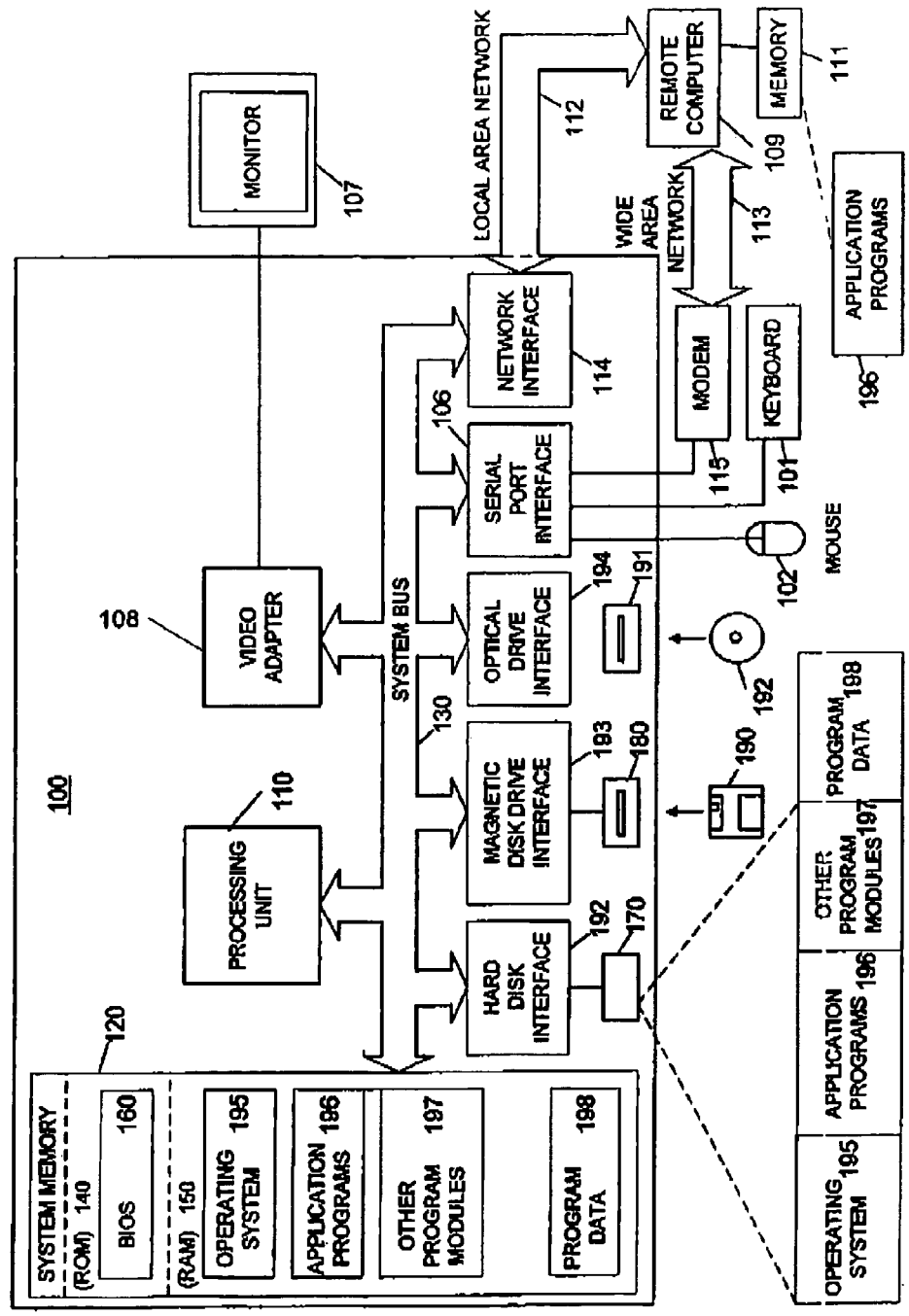
FIG. 1 shows a functional block diagram of a conventional general-purpose computer system.

FIG. 1 is a functional block diagram of an example of a conventional general-purpose digital computing environment that can be used in connection with selecting parameter value combinations to use when testing software modules. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
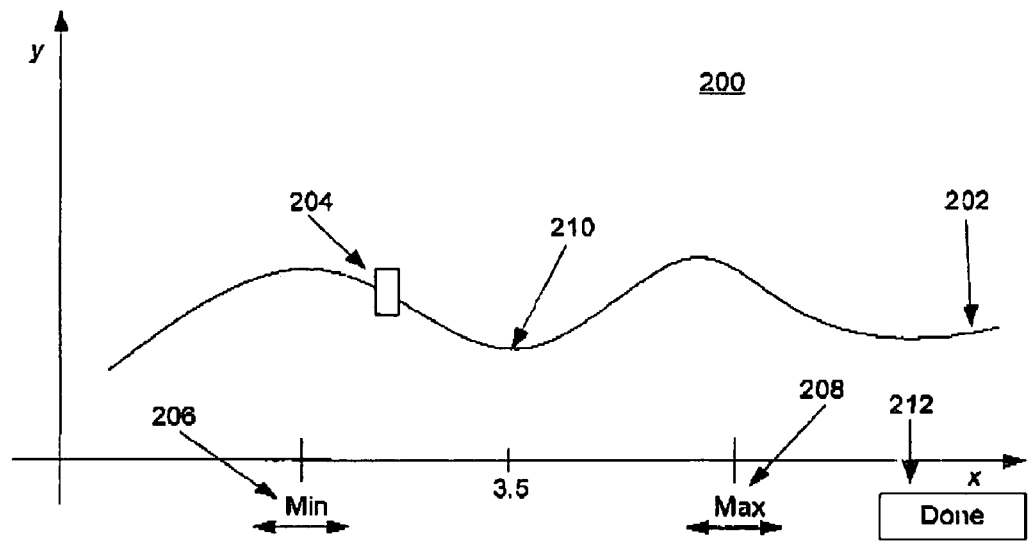
FIG. 2 illustrates a graphical user interface that may be used to indicate the relative importance of a parameter that will in tested, in accordance with an embodiment of the invention.

FIG. 2 illustrates a graphical user interface 200 that may be used to indicate the relative importance of a parameter that will in tested, in accordance with an embodiment of the invention. A probability curve 202 has a default shape and an adjustment icon 204 that may be used to alter the shape. A min icon 206 and a max icon 208 may be used to establish a domain for the relevant parameter. In operation a user may drag adjustment icon along probability curve 202 and then parallel to the y axis to alter the shape of probability curve 202. For example, if 3.5 is a relatively important value for the parameter represented by probability curve 202, a user may drag icon 204 to position 210 and then alter the shape of probability curve 202 by dragging the icon away from the x axis. Of course, less important values may be represented by the corresponding section of probability curve 202 being closer to the x axis. The user may also adjust the locations of min icon 206 and max icon 208 to set boundaries for values that will ultimately be tested. After probability curve 202, min icon 206 and max icon 208 are set, the user may then select a done icon 212. Additional probability curves corresponding to additional parameters may also then be adjusted by the user.

One skilled in the art will appreciate that the user interface control elements shown in FIG. 2 merely correspond to one embodiment of the invention. Other embodiments of the invention may include other control elements for altering the shape of probability curve 202 and/or boundary elements. Moreover, a single user interface may include multiple probability curves, each of which corresponds to an individual parameter.

Figure 3:
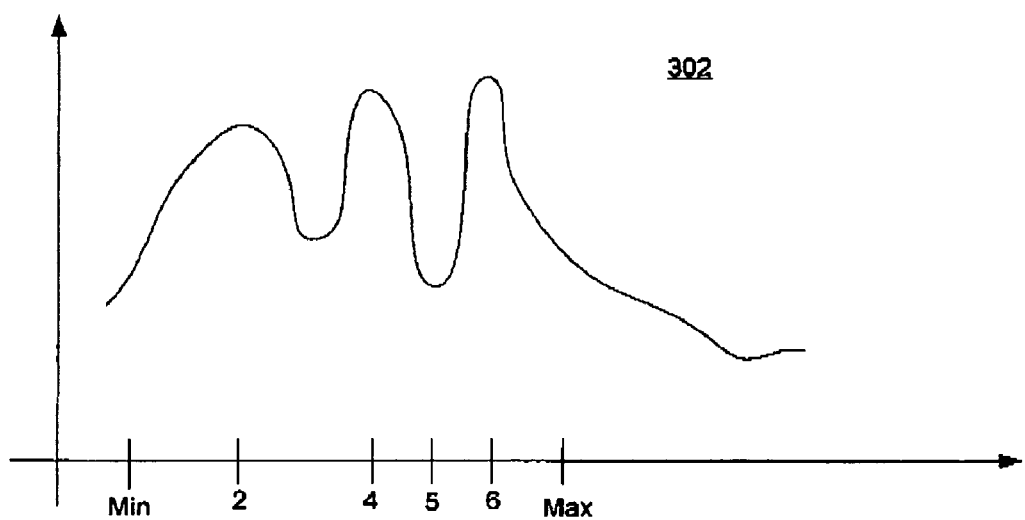
FIG. 3 illustrates an exemplary probability curve that has been adjusted by a user in accordance with an embodiment of the invention.

FIG. 3 illustrates an exemplary probability curve 302 that has been adjusted by a user in accordance with an embodiment of the invention. Probability curve 302 suggests that parameter values of 2, 4 and 6 are of high interest and the parameter value of 5 is of relatively low interest. The relative interest of a particular parameter value may be the result of numerous factors determined by a user. For example, a high interest parameter value may be a value that is likely to occur when a software module is in operation or a critical value.

Figure 4:
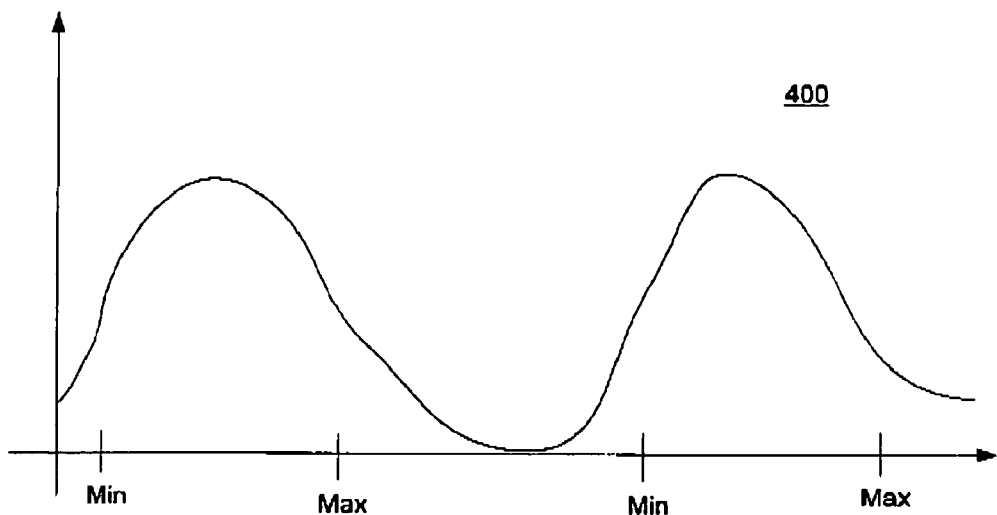
FIG. 4 illustrates a graphical user interface in which the domain of parameter values includes two nonconsecutive sections, in accordance with an embodiment of the invention.
Figure 5:
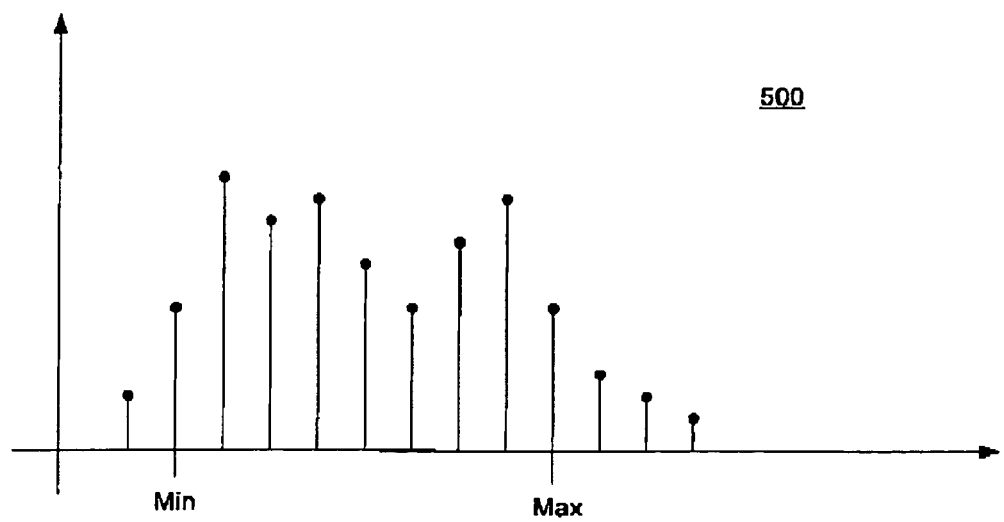
FIG. 5 illustrates a graphical user interface that may be used to set the relative interest of a domain of discrete parameter values, in accordance with an embodiment of the invention.

Aspects of the invention may be used with a variety of different domains of parameter values. FIG. 4, for example, illustrates a graphical user interface 400 in which the domain of parameter values includes two nonconsecutive sections. FIG. 5 illustrates a graphical user interface 500 that may be used to set the relative interest of a domain of discrete parameter values.

Figure 6:
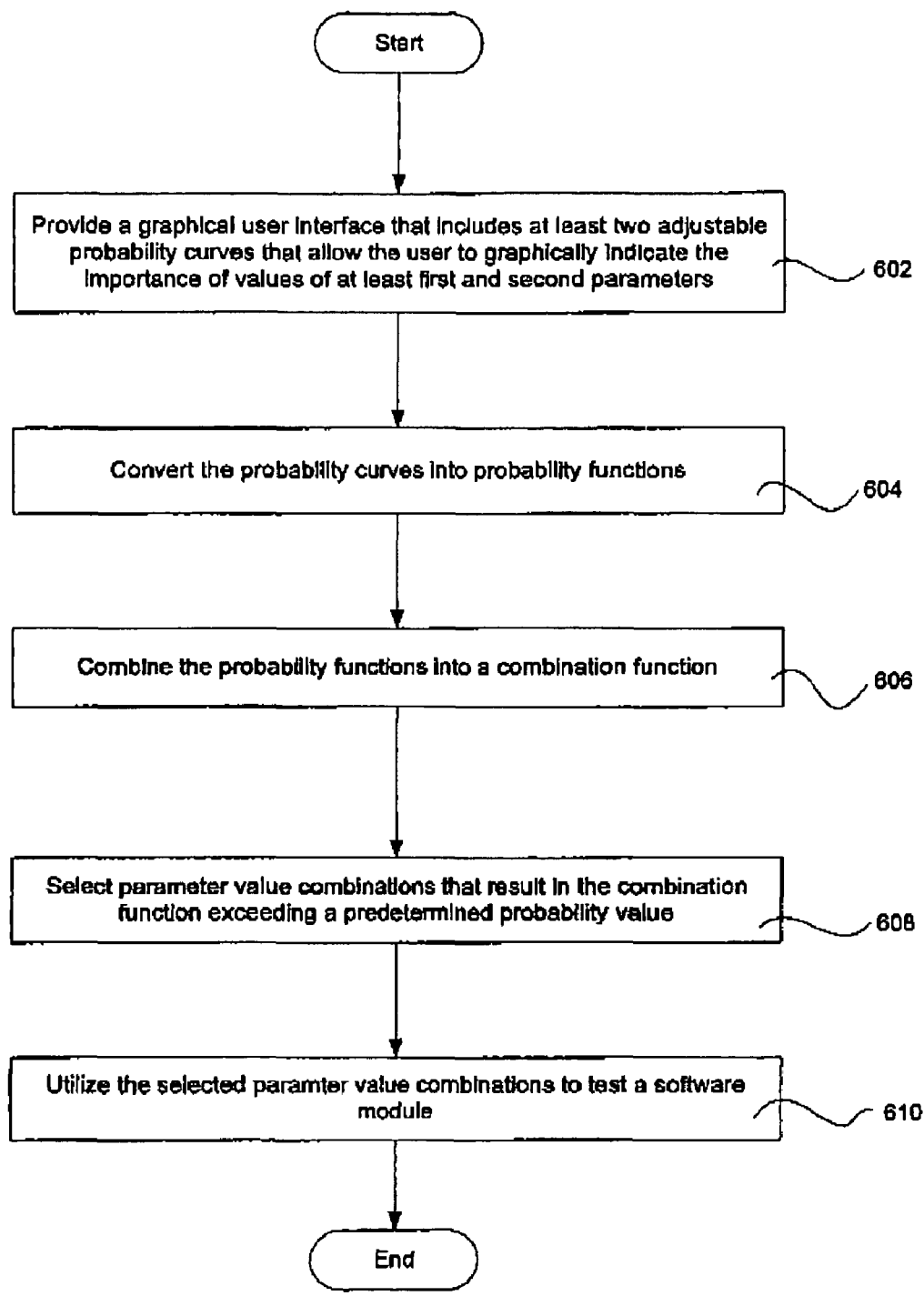
FIG. 6 illustrates a method of selecting and testing parameter value combinations in accordance with an embodiment of the invention.

FIG. 6 illustrates a method of selecting and testing parameter value combinations in accordance with an embodiment of the invention. First in step 602, a graphical user interface that includes at least two adjustable probability curves that allow the user to graphically indicate the importance of values of at least first and second parameters is provided to a user. Step 602 may consists of providing a graphical user interface similar to user interface 200 with separate screens corresponding to individual parameters. Alternatively a single screen may include multiple sections, each of which is similar to user interface 200. In another embodiment, multiple probability curves may be plotted in a single grid, e.g., user interface 200 may include multiple probability curves.

In step 604, the probability curves are converted into probability functions. Step 604 may include performing curve fitting, such as polynomial curve fitting. The degree of the polynomial may correspond to a desired accuracy level. Next, in step 606 the probability functions are combined into a combination function. In one embodiment of the invention, the combination function is normalized over the definition domains and is equal to:

$$\sum_{i=1}^{n} (2 * P(x_i) * \text{Max}(P(x_i)) - P(x_i)^2) \qquad \text{(equation 1)}$$

where n is the number of probability functions, $P(x_i)$ is the probability function for parameter $x_i$ and $\text{Max}(P(x_i))$ is the maximum value of the $P(x_i)$ probability function. In other embodiments, the combination function is equal to the product of the probability functions. Other combination functions may also be used to combine probability functions.

In step 608 parameter value combinations that result in the combination function exceeding a predetermined probability value are selected. When continuous combination functions are used, one or more value intervals may be selected by a user. For example, a user may wish to only evaluate values of a first parameter that are whole numbers and to evaluate values of a second parameter every 1.5 units. A user may select the predetermined value and receive an execution matrix of parameter value combinations that result in the combination function meeting or exceeding the predetermined value. The execution matrix may include the results of the combination function next to each parameter value combination. In an alternative embodiment, the execution matrix includes all parameter value combinations.

Finally, in step 610, the selected parameter value combinations are utilized to test a software module. Step 610 may include applying the selected parameter value combinations as input to the software module and analyzing the output(s) of the software module. Any one of the well know software module testing methods may be used.

Figure 7:
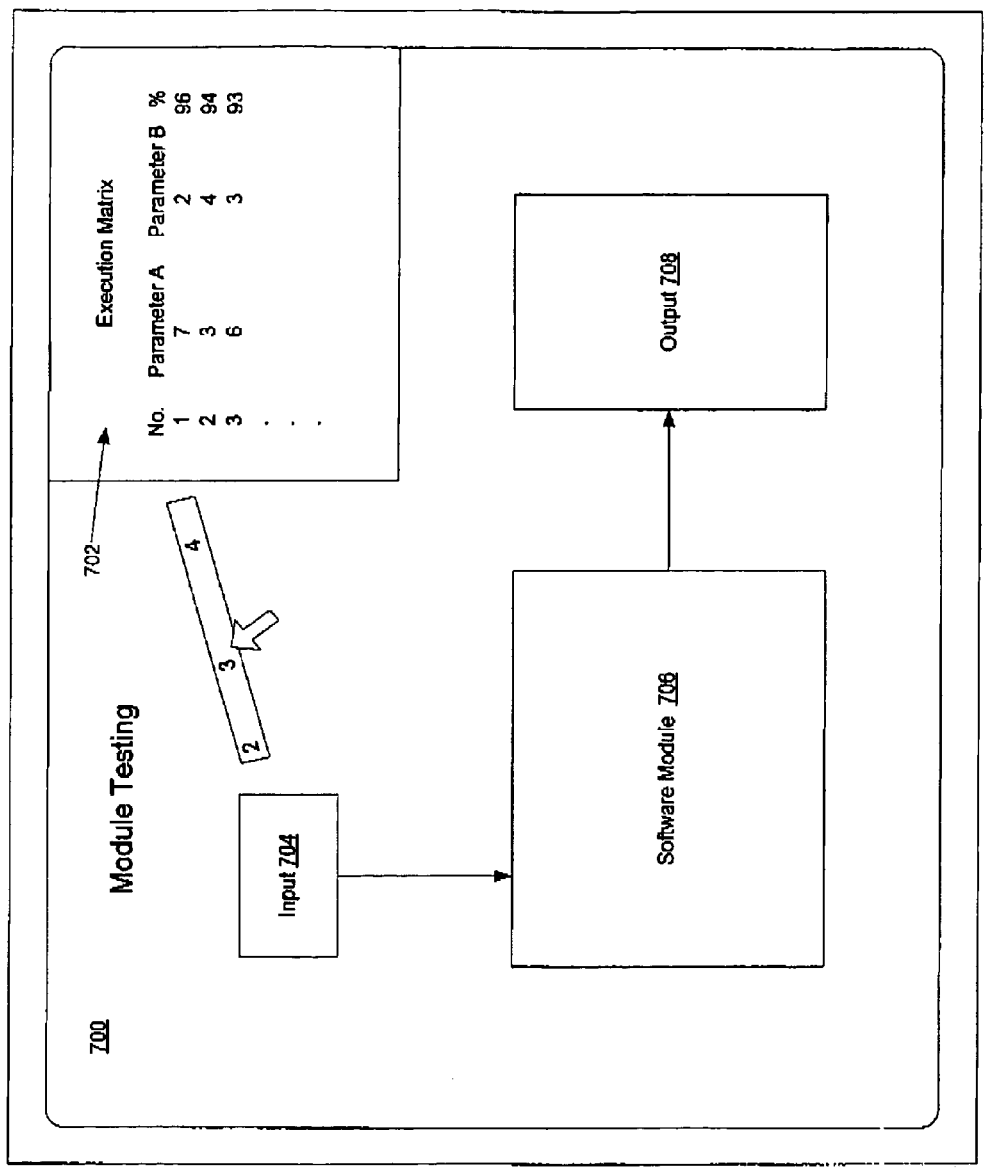
FIG. 7 illustrates a graphical user interface that may be used to test a software module, in accordance with an embodiment of the invention.

FIG. 7 illustrates a graphical user interface 700 that may be used to test a software module, in accordance with an embodiment of the invention. User interface 700 includes a first region 702 that displays an execution matrix of parameter combinations. An input icon 704 is displayed in a second region. A software module 706 may be represented in another region. A user may test a particular parameter value combination by selecting that combination from the execution matrix and dragging that combination to input icon 704. After the software module has operated on the parameter value combination, the results of the operation may be displayed in an output region 708.

Aspects of the present invention may be used to select other kinds of parameters as well—for example strings. String parameters may include, for example, length, character code and templates. For this example, the definition domain for the function may be:

(A, n, TemplateSet)

where:

A is the character code set n is the length of the string

TemplateSet is the collection of templates that may be of interests. This collection may include a predefined set of templates. The user may be allowed to add his or her own templates to the collection. For example, if A={"a", "c", "d"} with the respective probabilities {½, ¼, ¼} n={3, 4} with the respective probabilities {⅔, ⅓}

PatternSet={"Constant string", "Null String"} with the respective probabilities {⅔, ⅓}, applying the methods disclosed above results in the string "aaa."

Aspects of the present invention are not limited to embodiments that involve the testing of software modules. The disclosed user interfaces and parameter value combinations may be used to select parameters value combinations to test hardware, such as integrated circuits and other devices and methods.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. A method of generating a list of parameter value combinations to test, the method comprising:
   (a) providing to a user a graphical user interface that includes at least two adjustable probability curves that allow the user to graphically indicate the importance of values of at least first and second parameters;
   (b) converting the probability curves into probability functions;
   (c) combining the probability functions into a combination function; and
   (d) selecting parameter value combinations that result in the combination function exceeding a predetermined probability value.

2. The method of claim 1, wherein the combination function is equal to the product of the probability functions.

3. The method of claim 1, wherein the combination function is normalized over the definition domains and is equal to:

$$\sum_{i=1}^{n} (2 * P(x_i) * \text{Max}(P(x_i)) - P(x_i)^2)$$

where n is the number of probability functions, $P(x_i)$ is the probability function for parameter $x_i$ and $\text{Max}(P(x_i))$ is the maximum value of the $P(x_i)$ probability function.

4. The method of claim 1, wherein the graphical user interface in (a) allows the user to select domains for the values of the at least first and second parameters.

5. The method of claim 4, wherein a domain is selected by providing minimum and maximum values.

6. The method of claim 1, wherein (b) comprises performing polynomial curve fitting.

7. The method of claim 6, wherein the grade of the polynomial corresponds to a desired accuracy level.

8. The method of claim 1, wherein the parameters are numerical variables.

9. The method of claim 1, wherein the parameters comprise string parameters.

10. The method of claim 9, wherein a string parameter comprises length.

11. The method of claim 1, wherein the parameter combinations comprises inputs to a software module.

12. The method of claim 11, wherein the software module comprises an application programming interface.

13. The method of claim 1, wherein the parameter combinations comprise inputs to an integrated circuit.

14. A method of generating a list of parameter values to test, the method comprising:
   (a) providing to a user a graphical user interface that includes an adjustable probability curve that allows the user to graphically indicate the importance of values of a parameter;
   (b) converting the probability curve into a probability function; and
   (c) selecting parameter values that result in the probability function exceeding a predetermined probability value.

15. The method of claim 14, wherein the probability function is a continuous function and (c) includes selecting parameter values from a group of discrete parameter values that result in the probability function exceeding a predetermined probability value.

16. In a computer system having a graphical user interface including a display and a user selection device, a method of testing a software module with parameter combinations, comprising:
   (a) displaying in a first region of the display a list of parameter combinations;
   (b) displaying in a second region of the display an input icon;
   (c) receiving an indication from a user to drag at least one (of the parameter combinations to the input icon; and
   (d) in response to (c) displaying in a third region of the display an output of the software module.

17. The method of claim 16, wherein the list of parameter combinations includes parameter combination usage probabilities.

* * * * *